US009343981B2

(12) United States Patent
Osswald

(10) Patent No.: US 9,343,981 B2
(45) Date of Patent: May 17, 2016

(54) CHARGING DEVICE FOR CHARGING A BATTERY PACK

(75) Inventor: Alexander Osswald, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 988 days.

(21) Appl. No.: 13/383,395

(22) PCT Filed: Jun. 7, 2010

(86) PCT No.: PCT/EP2010/057877
§ 371 (c)(1),
(2), (4) Date: Apr. 17, 2012

(87) PCT Pub. No.: WO2011/015391
PCT Pub. Date: Feb. 10, 2011

(65) Prior Publication Data
US 2012/0194131 A1    Aug. 2, 2012

(30) Foreign Application Priority Data

Aug. 7, 2009  (DE) .......................... 10 2009 028 322

(51) Int. Cl.
*H02J 7/00*     (2006.01)
*H02M 3/335*    (2006.01)

(52) U.S. Cl.
CPC ................................ *H02M 3/33523* (2013.01)

(58) Field of Classification Search
CPC ................................................. H02M 3/33523
USPC ........................................ 320/140, 141, 145
See application file for complete search history.

(56) References Cited

U.S. PATENT DOCUMENTS

| 5,812,383 | A  | 9/1998  | Majid et al.    |
|-----------|----|---------|-----------------|
| 7,439,708 | B2 | 10/2008 | Aradachi et al. |
| 7,746,672 | B2 | 6/2010  | Nishikawa       |

(Continued)

FOREIGN PATENT DOCUMENTS

| CN | 1518185     | 8/2004 |
| DE | 102005022761 | 2/2006 |

(Continued)

OTHER PUBLICATIONS

International Search Report, PCT International Application No. PCT/EP2010/057877, dated Sep. 1, 2010.

*Primary Examiner* — Richard V Muralidar
(74) *Attorney, Agent, or Firm* — Norton Rose Fulbright US LLP

(57) ABSTRACT

A charging device for charging a battery pack, having a control circuit for a switched-mode power supply transformer assigned to the charging device, the transformer having at least one primary winding switchable using a power switch and at least one first secondary winding for generating an electrical output voltage for charging the battery pack, the output voltage having a first amplitude which is predefinable by a control unit and adjustable using a first voltage limiting control loop. The transformer has at least one second secondary winding for generating at least one electrical auxiliary voltage having a second amplitude which is predefinable by the control unit and adjustable using a second voltage limiting control loop in order to at least reduce an energy feed assigned to an operation of the control circuit from the primary winding to the secondary windings in a standby mode of the control circuit.

8 Claims, 2 Drawing Sheets

(56) References Cited

U.S. PATENT DOCUMENTS

| | | | |
|---|---|---|---|
| 8,279,631 B2 * | 10/2012 | Yang | H02J 7/0072 363/20 |
| 2003/0151928 A1 | 8/2003 | Kobori et al. | |
| 2005/0162874 A1 | 7/2005 | Umetsu | |
| 2005/0281062 A1 * | 12/2005 | Choi et al. | 363/21.08 |
| 2009/0180302 A1 * | 7/2009 | Kawabe | H02M 3/33523 363/21.01 |

FOREIGN PATENT DOCUMENTS

| | | |
|---|---|---|
| DE | 102008027054 | 1/2009 |
| WO | 2006061924 A1 | 6/2006 |

* cited by examiner

CHARGING DEVICE FOR CHARGING A BATTERY PACK

FIELD OF THE INVENTION

The present invention relates to a charging device for charging a battery pack, having a control circuit for a switched-mode power supply transformer assigned to the charging device, the transformer having at least one primary winding which is switchable using a power switch and at least one first secondary winding for generating an electrical output voltage for charging the battery pack, the output voltage having a first amplitude which is predefinable by a control unit and adjustable using a first voltage limiting control loop.

BACKGROUND INFORMATION

German Patent Application No. DE 10 2005 022 761 A1 describes a charging device having an assigned control circuit, the switched-mode power supply transformer being used for performing a normal operation or a charging operation. In standby operation, in which the charging device is operated in a standby mode, an additional transformer, which is switchable using a separate power switch, is used for generating a supply voltage for the control unit. A disadvantage is that the charging device and its control circuit are complex with regard to circuitry and are thus expensive.

SUMMARY

One object of the present invention is to provide a charging device for charging a battery pack, the charging device having a control circuit which may be simplified with regard to circuitry and implemented economically.

In accordance with an example embodiment of the present invention, a control circuit is provided for a switched-mode power supply transformer having at least one primary winding which is switchable using a power switch and at least one first secondary winding for generating an electrical output voltage for operating an electrical consumer. The output voltage has a first amplitude which is predefinable by a control unit, the amplitude being adjustable using a first voltage limiting control loop. The transformer has at least one second secondary winding for generating at least one electrical auxiliary voltage having a second amplitude which is predefinable by the control unit. This control unit may be adjusted using a second voltage limiting control loop, in order to at least reduce an energy feed assigned to an operation of the control circuit from the primary winding to the secondary windings in a standby mode of the control circuit.

The present invention thus makes it possible to provide a simply designed, cost-effective control circuit for a switched-mode power supply transformer which may be used to achieve at least a reduction of the power consumption of the charging device in standby mode, i.e., in standby operation.

According to one specific embodiment, the first voltage limiting control loop has a first voltage regulator for adjusting the first amplitude and the second voltage limiting control loop has a second voltage regulator for adjusting the second amplitude.

This makes it possible to implement the control circuit in a simple manner.

The second voltage regulator preferably has an LED and/or a Zener diode.

This makes it possible to provide a simple and cost-effective second voltage regulator.

According to one specific embodiment, the power switch may be activated using a pulse width modulation module, it being possible for the pulse width modulation module to be switched on and off by the second voltage regulator for reducing the assigned energy feed from the primary winding to the secondary windings in a standby mode of the control circuit.

The present invention thus makes it possible to activate the power switch reliably and securely for reducing the assigned energy feed in the standby mode of the control circuit.

At least one of the first and second voltage limiting control loops is connected to the pulse width modulation module via an optocoupler.

This makes it possible to activate the pulse width modulation module simply and effectively, in particular if the control circuit is used in a device having electrical isolation.

According to one specific embodiment, the control unit is operatable using a supply voltage derivable from the electrical auxiliary voltage, the second voltage limiting control loop being designed for at least reducing an amplitude assigned to the supply voltage.

The present invention thus makes it possible for the control unit to be operated in a standby mode of the control circuit using a supply voltage at reduced amplitude, so that a power loss associated with the charging device in standby mode may be at least reduced in a simple manner.

The second voltage limiting control loop is preferably designed for reducing the amplitude assigned to the supply voltage up to a minimum value required for an operational readiness of the control unit.

This makes it possible to minimize the power loss assigned to the charging device in standby mode.

The second voltage limiting control loop is preferably designed for at least reducing the first amplitude in the standby mode of the control circuit.

The present invention thus makes it possible to reduce the power loss associated with the control circuit in standby mode in a simple and efficient way.

In accordance with an example embodiment of the present invention, a charging device is provided for charging a battery pack having a control circuit for a switched-mode power supply transformer assigned to the charging device, the transformer having at least one primary winding which is switchable using a power switch and at least one first secondary winding for generating an electrical output voltage for charging the battery pack. The output voltage has a first amplitude which is predefinable by a control unit, the amplitude being adjustable using a first voltage limiting control loop. The transformer has at least one second secondary winding for generating at least one electrical auxiliary voltage having a second amplitude which is predefinable by the control unit. This control unit may be adjusted using a second voltage limiting control loop, in order to at least reduce an energy feed assigned to an operation of the control circuit from the primary winding to the secondary windings in a standby mode of the control circuit.

BRIEF DESCRIPTION OF THE DRAWINGS

The present invention is explained in greater detail below referring to exemplary embodiments depicted in the figures.

DETAILED DESCRIPTION OF EXAMPLE EMBODIMENTS

Figure 1:
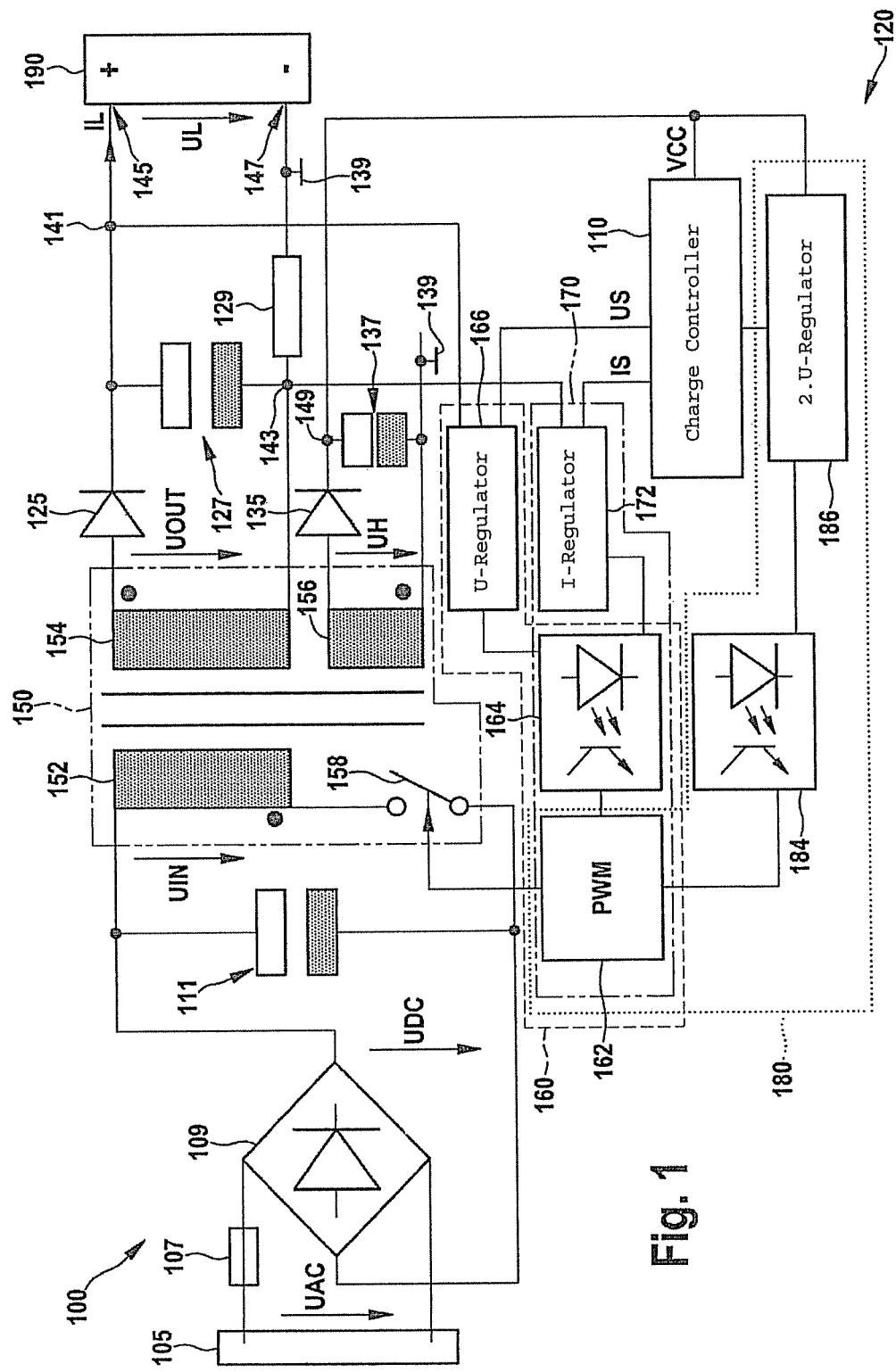
FIG. 1 shows a simplified schematic diagram of a charging device having a control circuit according to one specific embodiment.

FIG. 1 shows in schematic form a charging device 100 for charging a battery pack 190, the charging device having a switched-mode power supply transformer 150 which generates an electrical output voltage UOUT and an auxiliary voltage UH from an electrical input voltage UIN. According to one specific embodiment, a control circuit 120 for controlling electrical energy supplied to transformer 150 is assigned to charging device 100.

An exemplary implementation of charging device 100 is described in detail below with reference to FIG. 2. However, it is pointed out that the description of the use of control circuit 120 in the case of charging device 100 is simply of an exemplary nature and is not used for restricting the present invention. Instead, control circuit 120 may be used, for example, in any type of power pack or power supply unit in which a switched-mode power supply transformer is used for generating an electrical output voltage for the operation of an electrical consumer. For example, control circuit 120 could be used in a power supply of a portable computer where the power supply unit is switchable into a standby operation, in the event that the computer is switched off and a battery pack assigned to it is charged.

According to one specific embodiment, charging device 100 is connected to an input voltage source 105 for voltage supply, which is designed, for example, as an alternating voltage source. However, it is possible to operate charging device 100 on a direct voltage source, for which simple input-side modifications of the circuit depicted in FIG. 1 may be necessary.

Input voltage source 105 is connected to a bridge rectifier 109 via a fuse 107, for example, a glass tube fuse, the bridge rectifier converting an alternating current UAC supplied by input voltage source 105 into an input direct voltage UDC. On its output side, bridge rectifier 109 is connected to an electrolytic capacitor 111 which is designed for smoothing input direct voltage UDC. Its anode is connected to one end of a primary winding 152 of switched-mode power supply transformer 150 and its cathode is connected via a power switch 158 to the other end of primary winding 152. Power switch 158 is used for clocking primary winding 152, to which smoothed input voltage UIN smoothed by electrolytic capacitor 111 is applied, and is activatable using a pulse width modulation module (PWM module) 162.

Primary winding 152 transmits energy supplied to it with input voltage UIN to at least one first secondary winding 154, which is hereinafter referred to as "secondary main winding." Secondary main winding 154 is used for generating electrical output voltage UOUT, from which, for example, a charging voltage UL for charging battery pack 190 is derivable, the charging voltage being, for example, in a voltage range from 12 V to 42 V. To this end, one end of secondary main winding 154 is connected to an anode of a diode 125, the cathode of which is on the one hand connected to the anode of an electrolytic capacitor 127 and on the other to a node 141. This node is connected to a first voltage regulator 166 and to a positive pole of battery pack 190 via, for example, a first terminal 145. The other end of secondary main winding 154 is connected to a node 143. This node is connected to a current regulator 172, the cathode of electrolytic capacitor 127 and an ohmic resistor 129, which is in turn connected to ground 139 and, via a second terminal 147, for example, to a negative pole of battery pack 190.

Components 125, 127 make up, for example, a flyback converter for charging device 100, electrolytic capacitor 127 being used for smoothing output voltage UOUT, so that smoothed charge voltage UL is applied to battery pack 190. It is pointed out, however, that the implementation of a flyback converter is only of an exemplary nature and is not used as a restriction of the present invention, since it is also implementable using, for example, a forward converter. Furthermore, the design of components 125, 127 may be varied. For example, instead of electrolytic capacitor 127, a suitable, sufficiently large-sized film capacitor may also be used.

According to one specific embodiment, primary winding 152 transfers the energy supplied to it also to a second secondary winding 156, which is hereinafter referred to as "secondary auxiliary winding." Secondary auxiliary winding 156 is used for generating auxiliary voltage UH, which has preferably approximately 10 V. One end of secondary auxiliary winding 156 is connected to an anode of a diode 135 whose cathode is connected to a node 149. The other end of secondary auxiliary winding 156 is connected to the cathode of an electrolytic capacitor 137 and to ground 139.

Components 135, 137 together with switched-mode power supply transformer 150 form, for example, a forward converter, electrolytic capacitor 137 being used for smoothing auxiliary voltage UH. It is pointed out, however, that the implementation of a forward converter is only of an exemplary nature and is not used as a restriction of the present invention, since, as described above, it is also implementable using, for example, a flyback converter. Furthermore, the design of components 135, 137 may be varied similarly to the design of components 125, 127 described above.

According to one specific embodiment, first voltage regulator 166 which is connected to node 141 on the input side is moreover connected to a control unit 110 on the input side and to a first optocoupler 164 on the output side. Voltage regulator 172 which is connected to node 143 on the input side is also connected to control unit 110 on the input side and also to a first optocoupler 164 on the output side. First optocoupler 164 is connected to PWM module 162.

PWM module 162, optocoupler 164 and first voltage regulator 166 form, as an example, a first voltage limiting control loop 160 for limiting an amplitude of output voltage UOUT and thus charging voltage UL which is applied to battery pack 190 in the case of a charging operation. PWM module 162, optocoupler 164 and current regulator 172 form, as an example, a current limiting control circuit 170 for limiting a charging current IL supplied to battery pack 190 in the case of a charging operation. Control loops 160, 170 are situated on the secondary side of transformer 150 and may therefore also be referred to as secondary control loops.

Control unit 110 is designed as a charge controller as an example. This charge controller is preferably designed for recognizing a battery type assigned to battery pack 190 to be charged and an operating state of charging device 100, for example, an operation at idle state and with or without an attached battery pack 190 for activating first voltage regulator 166 and/or current regulator 172 as a function of a particular detected battery type or operating condition. Since the function as well as an implementation of a suitable charge controller is adequately known to those skilled in the art, a detailed description of charge controller 110 is omitted here.

Charge controller 110 is connected on the input side to node 149, via which a supply voltage VCC derived from auxiliary voltage UH is applied to charge controller 110. On the output side, this charge controller is furthermore connected to a second voltage regulator 186, which is also connected to node 149 on the input side. Second voltage regulator 186 is, for example, implementable using an LED and/or a Zener diode and is connected on the output side to PWM module 162 via a second optocoupler 184.

PWM module 162, optocoupler 184 and second voltage regulator 186 form, as an example, a second voltage limiting control loop 180 for limiting supply voltage VCC which is applied to charge controller 110 in standby operation. Since control loop 180 is also situated on the secondary side of transformer 150, it may also be referred to as a secondary control loop.

When charging device 100 is operated, charge controller 110 determines whether battery pack 190 is connected to terminals 145, 147 and is to be charged. If a corresponding charge is to be carried out, charge controller 110 initiates a charging operation and determines a battery type assigned to battery pack 190. As a function of the particular type of battery, charge controller 110 then, for example, outputs a suitable output or charging voltage setpoint value US to first voltage regulator 166 for charging battery pack 190, for example, US=42V. As an alternative to this, a first output or charging current setpoint value IS may be output to current regulator 172.

Voltage regulator 166 now activates power switch 158 via optocoupler 164 and PWM module 160 in such a way that energy is supplied to primary main winding 152 in such a way that output voltage UOUT generated by secondary main winding 154 has an amplitude corresponding to charging voltage setpoint value US. Output voltage UOUT thus has a first amplitude which is predefinable by control unit 110, it being possible to adjust the amplitude using first voltage regulator 166 of first voltage limiting control loop 160. At the same time, auxiliary voltage UH generated by secondary auxiliary winding 156 has a second amplitude which, as described above, has preferably approximately 10 V. This auxiliary voltage UH=10V is reduced to supply voltage VCC required for the charging operation of charge controller 110 of approximately, for example, VCC=5 V via, for example, a voltage adjustment module 250 (FIG. 2) implemented by charge controller 110.

If no charging is to be carried out, or after the charging operation, charging device 100 goes into a standby mode or standby operation. In this standby mode, charge controller 110 may be operated at a reduced supply voltage VCC, at which only full functionality of charge controller 110 is to be assured. For that reason, according to one specific embodiment, charge controller 110 has second voltage regulator 186 and accordingly second voltage limiting control loop 180 in standby mode to reduce auxiliary voltage UH generated by secondary auxiliary winding 156 and thus an amplitude assigned to supply voltage VCC and preferably adjusts them to a minimum value required for maintaining the full functionality, for example, VCC=3 V, and thus reduces or minimizes a corresponding power consumption of charging device 100 in standby operation.

To reduce auxiliary voltage UH, second voltage regulator 186 activates PWM module 162 via optocoupler 184, for example, in a pulse packet operation in which the PWM module, for example, switches power switch 158 on and off, so that the power consumption of primary winding 152, and thus also the amplitude of auxiliary voltage UH generated by secondary auxiliary winding 156, is reduced or minimized. In a similar way, a no-load voltage generated by secondary main winding 154 or the first amplitude assigned to output voltage UOUT may also be reduced or minimized.

As an alternative to this, PWM module 162 may be switched completely on and off in a suitable manner for reducing the auxiliary voltage. For example, for the operation of PWM module 162, it is possible for this purpose to switch an auxiliary voltage source 256 (FIG. 2) and accordingly PWM module 162 completely on and off. It is also possible via optocoupler 184 to access power switch 158 directly in order to activate it in a suitable manner to reduce the auxiliary voltage.

According to one specific embodiment, optocoupler 184 closes at a supply voltage VCC<3 V, so that PWM module 162 shifts into an operating state assigned to the normal operation or charging operation of charging device 100 and thus the energy feed from primary winding 152 to secondary windings 154, 156 is increased, so that the amplitude of auxiliary voltage UH generated by secondary auxiliary winding 156 and thus the amplitude of supply voltage VCC are increased again. If this supply voltage then exceeds the value of 3 V, second optocoupler 184 becomes conductive again and again causes this amplitude to be reduced, as described above FIG. 2 shows one specific embodiment of charging device 100 of FIG. 1, in which exemplary implementations of bridge rectifier 109, charge controller 110, switched-mode power supply transformer 150, PWM module 162, first voltage regulator 166, current regulator 172 and second voltage regulator 186 are used. As described in FIG. 1, modules or components 162, 164, 166 form first secondary voltage limiting control loop 160, modules or components 162, 164, 172 form secondary current limiting control loop 170 and modules or components 162, 184, 186 form second secondary voltage limiting control loop 180, which are not shown separately to simplify the diagram in FIG. 2. It is pointed out, however, that the depicted implementation of these components is only of an exemplary nature, and the implementation can be modified in various ways without thereby altering their functionality according to the present invention.

Bridge rectifier 109 is designed, as an example, having four diodes 201, 203, 205, 207, the anode of diode 201 being connected to fuse 107 and the cathode of diode 203. Its cathode is connected to the cathode of diode 205 and the anode of electrolytic capacitor 111. The anode of diode 205 is connected to input voltage source 105 and the cathode of diode 207. Its anode is connected to the anode of diode 203 and the cathode of electrolytic capacitor 111.

Charge controller 100 has, as an example, a resistor 231 which is situated between node 149 and the cathode of a reference diode 235 and the base of an NPN bipolar transistor 233. The collector of transistor 233 is also connected to node 149; its emitter is, on the one hand, connected to a node 252 via a resistor 237 and, on the other hand, to a terminal 245 and an electrode of a capacitor 239. The other electrode of capacitor 239 is connected to ground 139, the anode of reference diode 235 and to node 252 via a resistor 241. This node is also connected to a control terminal of reference diode 235. As mentioned with reference to FIG. 1, these components of charge controller 110 form voltage adjustment module 250, which converts the auxiliary voltage of, for example, 10 V generated by secondary auxiliary winding 156 into supply voltage VCC of, for example, approximately 5 V, which may be tapped at terminal 245.

Node 252 is connected via a resistor 293 to first voltage regulator 166 for predefining an output voltage setpoint value for output voltage UOUT or charging voltage UL to be generated at secondary main winding 154. Supply voltage VCC which may be tapped at terminal 245 is applied to current regulator 172 via a resistor 289 for predefining a charging current setpoint value for charging current IL, and via a resistor 291 connected to resister 289. It is applied to a first output 271 of a microprocessor 290 which is also assigned to charge controller 110, the microprocessor being grounded via ground 139. Supply voltage VCC is supplied to the microprocessor for operation via terminal 245.

A second output 273 of microprocessor 290 is connected via a resistor 295 to node 141, via a resistor 299 to a third output 275 of microprocessor 290, via a resistor 297 to ground 139 and to first voltage regulator 166. A fourth output 277 of microprocessor 290 is connected to second voltage regulator 186.

Switched-mode power supply transformer 150 has, for example, primary winding 152, which according to one specific embodiment has a primary main winding 254 and a primary auxiliary winding 256, secondary windings 154, 156, as well as power switch 158, designed, for example, as a semiconductor switch, e.g., an N-channel MOSFET type field effect transistor. The power switch's gate terminal is connected to a node 212 assigned to PWM module 162 and its source terminal is connected to a node 214 assigned to PWM module 162. The drain terminal of N-channel MOSFET 158 is connected to primary main winding 254.

As described with reference to FIG. 1, input voltage UIN is applied to primary main winding 254. Primary auxiliary winding 256 is operatively connected to this primary main winding 254 and is used for generating an operating voltage UPWM for operating PWM module 162.

PWM module 162 has, as an example, node 212 connected to the anode of electrolytic capacitor 111 via a series resistor 211, node 212 also being connected to a node 214 via a main resistor 213, node 214 being in turn connected to the cathode of electrolytic capacitor 111 via a shunt resistor 215. This cathode is also connected to one end of primary auxiliary winding 256 and to the emitter of an NPN bipolar transistor 217, whose collector is connected to node 212 and its base is connected to node 222. This node 222 is, on the one hand, connected to node 214 via a capacitor 219 and, on the other hand, to a node 224 via a resistor 227, which is also connected to the cathode of a diode 225. The anode of diode 225 is, on the one hand, connected to the other end of primary auxiliary winding 256 and, on the other hand, to node 212 via a series connection of a capacitor 223 and a resistor 221.

Figure 2:
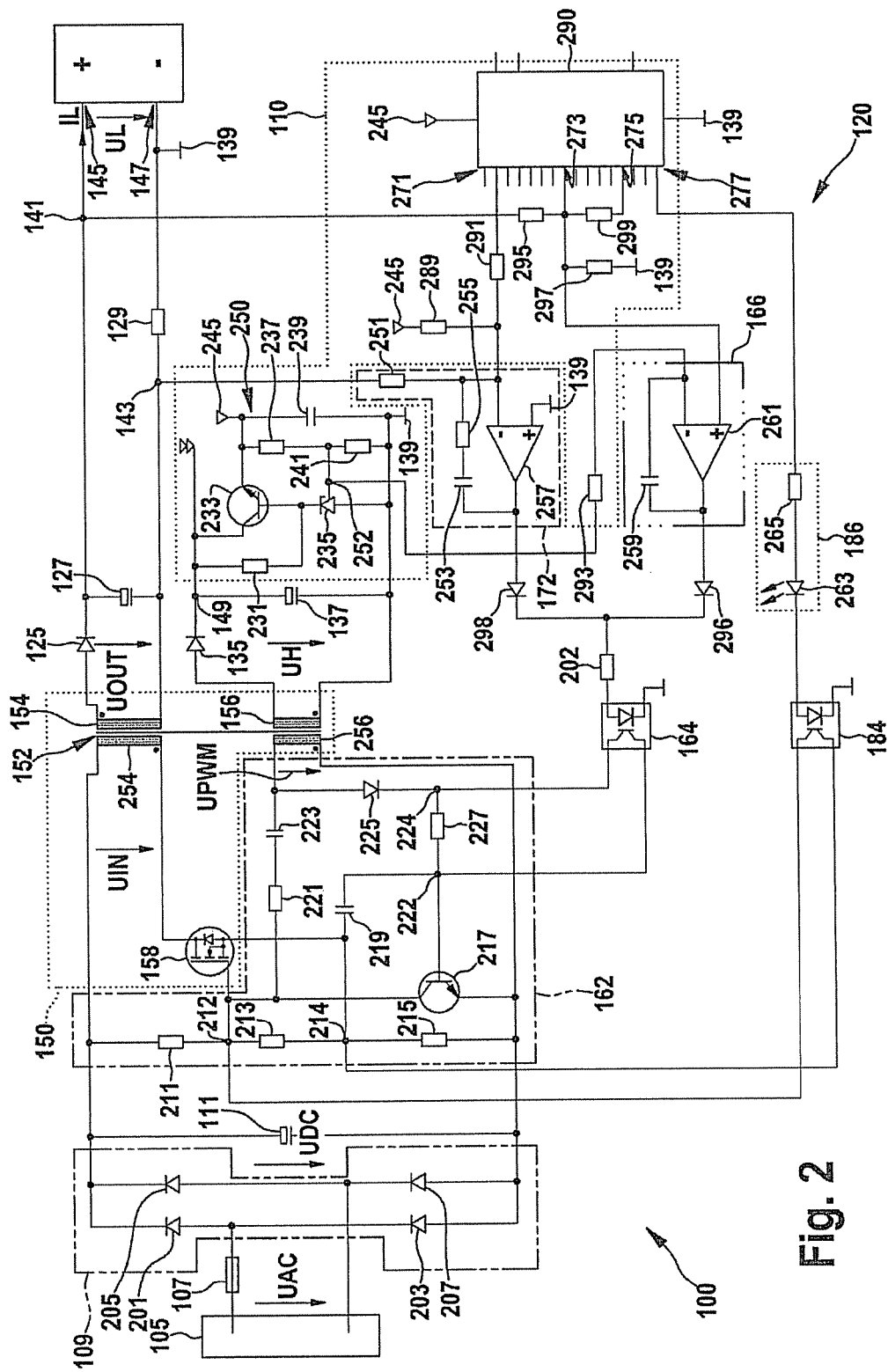
FIG. 2 shows a simplified diagram of an exemplary implementation of the charging device of FIG. 1.

PWM module 162 in FIG. 2 is, as an example, designed to be self-oscillating using analog components. As an alternative to this, a discrete design, for example, having a suitable microprocessor, is also possible.

First voltage regulator 166 has, as an example, an operational amplifier 261, the inverting input of which is, on the one hand, connected to resistor 293 and, on the other hand, connected to its output via a capacitor 259, the output defining the output of voltage regulator 166. The non-inverting input of operational amplifier 261 is connected to second output 273 of microprocessor 290 assigned to charge controller 110. On the output side, first voltage regulator 166 is connected to the anode of a diode 296.

Current regulator 172 has, as an example, an operational amplifier 257, whose non-inverting input is connected to ground 139. Its inverting input is connected to first output 271 of its microprocessor 290 via resistor 291 assigned to charge controller 110. Moreover, the inverting input of operational amplifier 257 is connected to node 143 via a resistor 251 and via a series connection made up of a resistor 255 and a capacitor 253 to the output of operational amplifier 257, which defines the output of current regulator 172. This current regulator is connected to the anode of a diode 298.

The cathodes of diodes 296, 298 are connected via a resistor 202 to an input side of optocoupler 164, which on its output side is connected to nodes 222, 224 assigned to PWM module 162. Diodes 296, 298 may be designed, for example, as LEDs and are used for decoupling regulators 166, 172.

Second voltage regulator 186 has a resistor 265 which is connected to the fourth output of microprocessor 290 assigned to charge controller 110, resistor 265 also being connected to the anode of an LED 263. Its cathode is connected to an input side of optocoupler 184, which is connected on the output side to nodes 212, 214 assigned to PWM module 162.

The functionality of charge device 100 was already described in detail with reference to FIG. 1. The functionality of the individual components of FIG. 2 is conventional, making it possible to omit a more detailed description of the function of the exemplary specific embodiment of charging device 100 shown in FIG. 2 for the sake of brevity of the description.

What is claimed is:

1. A control circuit for a switched-mode power supply transformer having at least one primary winding which is switchable using a power switch, at least one first secondary winding for generating an electrical output voltage for operating an electrical consumer, and at least one second secondary winding for generating at least one electrical auxiliary voltage, the control circuit comprising:
    a control unit configured to predefine a first amplitude of the output voltage, and to predefine a second amplitude of the auxiliary voltage;
    a first voltage limiting control loop configured to adjust the first amplitude; and
    a second voltage limiting control loop configured to adjust the second voltage to at least reduce an energy feed assigned to an operation of the control circuit from the primary winding to the secondary windings in a standby mode of the control circuit;
    wherein the first voltage limiting control loop includes a first voltage regulator to adjust the first amplitude, and the second voltage limiting control loop includes a second voltage regulator to adjust the auxiliary amplitude, wherein the second voltage regulator includes an LED and wherein the LED is connected to an optocoupler.

2. The control circuit as recited in claim 1, wherein the second voltage regulator includes a Zener diode.

3. The control circuit as recited in claim 1, further comprising:
    a pulse width modulation module to activate the power switch, the pulse width modulation module being switched on and off by the second voltage regulator to reduce the energy feed from the primary winding to the secondary windings in the standby mode of the control circuit.

4. The control circuit as recited in claim 3, wherein at least one of the first and second voltage limiting control loops is connected to the pulse width modulation module via the optocoupler.

5. The control circuit as recited in claim 1, wherein the control unit is operated using a supply voltage derivable from the electrical auxiliary voltage, the second voltage limiting control loop being configured to reduce an amplitude assigned to the supply voltage.

6. The control circuit as recited in claim 5, wherein the second voltage limiting control loop is configured to reduce the amplitude assigned to the supply voltage up to a minimum value required for an operational readiness of the control unit.

7. The control circuit as recited in claim 1, wherein the second voltage limiting control loop is configured to reduce the first amplitude in the standby mode of the control circuit.

8. A charging device for charging a battery pack, comprising:

a switched-mode power supply transformer having at least one primary winding which is switchable using a power switch, at least one first secondary winding for generating an electrical output voltage for charging the battery pack, and at least one second secondary winding for generating at least one electrical auxiliary voltage;

a control unit configured to predefine a first amplitude of the output voltage and to predefine a second amplitude of the auxiliary voltage;

a first voltage limiting control loop configured to adjust the first amplitude; and a second voltage limiting control loop configured to adjust the second amplitude to reduce an energy feed assigned to an operation of the control circuit from the primary winding to the secondary windings in a standby mode of the control circuit;

wherein the first voltage limiting control loop includes a first voltage regulator to adjust the first amplitude, and the second voltage limiting control loop includes a second voltage regulator to adjust the second amplitude, wherein the second voltage regulator includes an LED and wherein the LED is connected to an optocoupler.

* * * * *